Oct. 15, 1957  S. P. JOHNSON ET AL  2,809,549
ADAPTABLE COUPLING FOR THREADS OF VARIOUS PITCHES
Filed Feb. 18, 1955

INVENTORS
SIDNEY P. JOHNSON
HAROLD BROWNING

BY George Sipkin
B. L. Zangwill
ATTORNEYS 2,809,549

ADAPTABLE COUPLING FOR THREADS OF VARIOUS PITCHES

Sidney P. Johnson, Washington, D. C., and Harold Browning, Bladensburg, Md.

Application February 18, 1955, Serial No. 489,311

3 Claims. (Cl. 85—32.1)

(Granted under Title 35, U. S. Code (1952), sec. 266)

The invention described herein may be manufactured and used by or for the Government of the United States of America for governmental purposes without the payment of any royalties thereon or therefor.

The present invention relates to an adaptable coupling for conduit threads of various pitches and more particularly to a coupling for conduit threads of different pitches which contains threads automatically adjustable to such pitches.

The prior art method of coupling conduit sections having threads of various pitches was to provide a plurality of adaptors, one for each thread having a different pitch. The disadvantage of requiring of plurality of adaptors is apparent in that changing adaptors is time consuming and when no adaptor was available no connection could be made. For example, these disadvantages could be embarrassing to fire departments when confronted with the necessity of connecting hose sections having threads of different pitch.

The invention is directed to a novel coupler for hose sections having threads which are adapted to fit with other threads of varying pitch. This is accomplished by making the mounting of the threads in the coupler somewhat resilient, fixedly anchoring one end of the thread in the coupler and adjustably anchoring the other end in the coupler. If the hose section to be coupled has a thread of different pitch than the coupler, the adjustable anchor causes the threads of the coupler to flex longitudinally and match the pitch of the threads on the section to be coupled.

An object of the present invention is the provision of an adjustable coupling device.

Another object is to provide a coupling swivel with a thread automatically adjustable in pitch.

Still another object is to provide an adjustable thread whereby it will be adapted to threadly engage other threads of varying pitch where the threads are approximately of the same diameter.

Other objects and many of the attendant advantages of this invention will be readily appreciated as the same becomes better understood by reference to the following detailed description when considered in connection with the accompanying drawings wherein.

Figure 1:
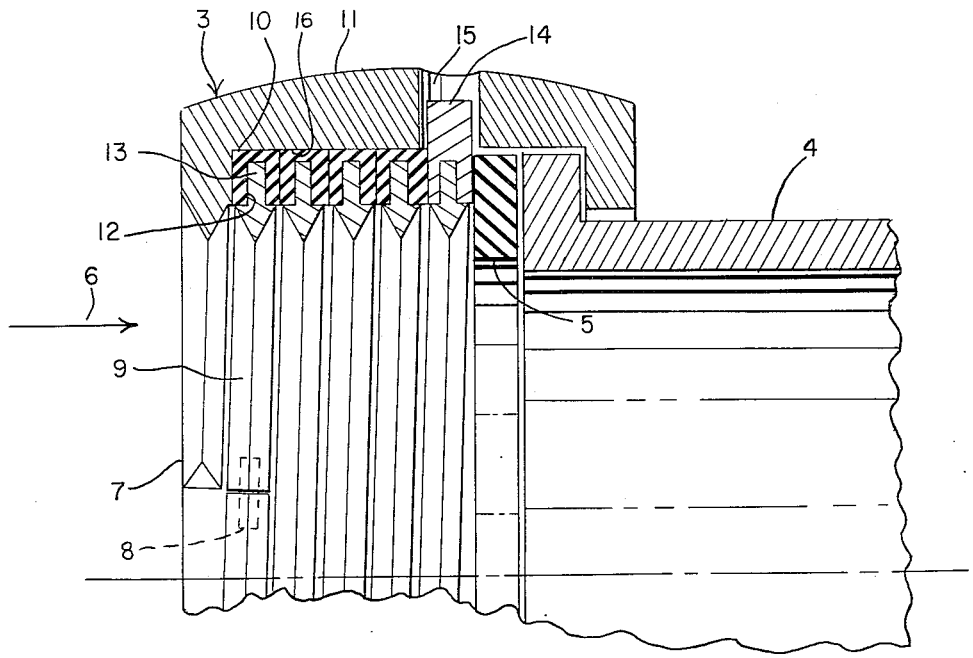
Fig. 1 is a cross-sectional view in elevation of the construction of the novel coupler and thread.

Referring now to the drawings, wherein like reference characters designate like or corresponding parts throughout the several views, a coupling swivel 3 is shown attached to a section of hose 4 in the conventional manner and a washer 5 between the swivel and hose section cooperates in a conventional manner. Looking at the figure in the direction of arrow 6, the coupler consists of a solid full thread 7. Anchored to the full pilot thread 7 by an alignment pin 8 is a variable thread 9. Variable thread 9 comprises a rubber portion 10 which may optionally be vulcanized to the coupling section 11. Rubber portion 10 has a groove 12 into which is inserted the shank of a continuous metal ribbon thread 13 which takes the form of a helical spring and is vulcanized therein. The other end of the variable thread is attached to an elongated metal stop pin 14 which is mounted in a hole 15 in the coupling section 11. The hole 15 is elongated in an axial direction and is of a larger diameter than the stop pin thereby making the stop pin a floating anchor which, in cooperation with the rubber portions of the thread, allows the thread to adjust to pitches of various lengths in an axial direction while preventing circumferential movement of the threads.

Figure 2:
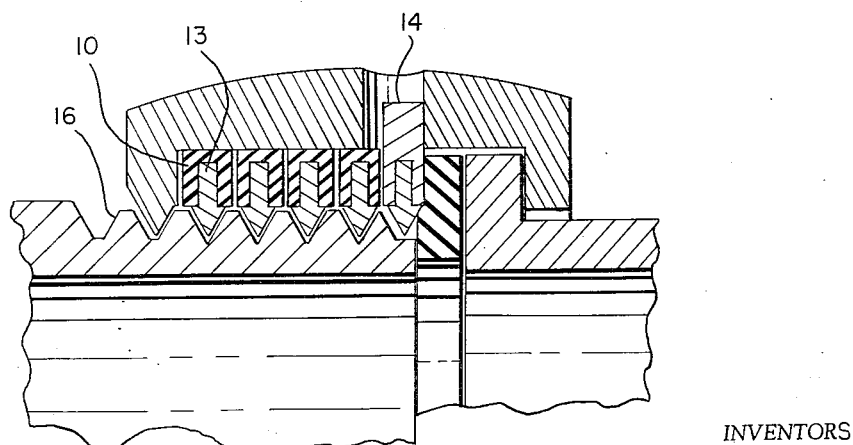
Fig. 2 is a cross-sectional view in elevation of the coupler and illustrates how the thread adapts to other threads of varying pitch.

Fig. 2 shows the swivel coupled to a thread 16 having a wide pitch. It will be noted that the stop pin 14 and the rubber portions 10 have moved longitudinally to allow the pitch of the threads 13 to align themselves with the pitch of the threads 16 coupled to the swivel.

It can be seen from the above description that a coupling swivel having a thread adjustable to pitches of various lengths functions in a manner whereby sections of hose or other threaded fastenings not of the same threaded pitch may be coupled.

Obviously many modifications and variations of the present invention are possible in the light of the above teachings, e. g. rubber portion 10 may be any elastic material and metal thread 13 may be of any suitable composition. It is therefore to be understood that within the scope of the appended claims the invention may be practiced otherwise than as specifically described.

What is claimed is:

1. A coupling device for confining fluid under pressure and including a swivel having an adjustable thread movably mounted therein for connecting the swivel to threaded members having threads of varying pitch, said adjustable thread comprising a first helical member formed of rubber-like material and having a smooth outer surface thereof for contact with an inner cylindrical surface of the swivel and an inner surface formed with a helical recess therein, said first helical member being mounted in the swivel for axial movement relative thereto, a second helical member formed of metal and having a helical projection on an outer surface thereof fitted within the helical recess in the inner surface of the first helical member and an inner helical surface wedge shape in cross section and forming the thread proper for connecting the swivel to one of the aforementioned threaded members, and means for maintaining the first and second helical members united within the swivel.

2. A coupling device as set forth in claim 1 wherein the swivel is provided with a rigid pilot thread at an entrance end thereof, which thread is joined to and forms a continuation of the second helical member.

3. A coupling device as set forth in claim 2 wherein the second helical member is fixedly fastened at one end thereof to an inner end of the pilot thread and adjustably fastened at the other end thereof to the swivel.

References Cited in the file of this patent

UNITED STATES PATENTS

| 175,562 | Hovey | Apr. 4, 1876 |
| 868,025 | Smith | Oct. 15, 1907 |
| 1,320,025 | Palmer | Oct. 28, 1919 |
| 1,817,772 | Sipe | Aug. 4, 1931 |
| 1,820,644 | Bach | Aug. 25, 1931 |
| 2,206,653 | Yonkers | July 2, 1940 |
| 2,461,863 | Zeeb | Feb. 15, 1949 |
| 2,775,992 | Smith | Jan. 1, 1957 |

FOREIGN PATENTS

| 980,989 | France | Jan. 10, 1951 |